United States Patent

[11] 3,550,580

[72] Inventor James Lee Wong
 1124 W. 18th St., Los Angeles, Calif. 90015
[21] Appl. No. 807,829
[22] Filed Mar. 17, 1969
[45] Patented Dec. 29, 1970

[54] MOVABLE TRAY FOR OVENS
 6 Claims, 6 Drawing Figs.
[52] U.S. Cl. .................................................. 126/337
[51] Int. Cl. ............................................. F24c 15/16
[50] Field of Search ................................. 126/337, 339, 340, 41

[56] References Cited
 UNITED STATES PATENTS

| 1,423,320 | 7/1922 | Haas | 126/337 |
| 1,838,552 | 12/1931 | Huenefeld | 126/337 |
| 1,891,394 | 12/1932 | Otte | 126/337 |
| 3,266,484 | 8/1966 | Carpenter et al. | 126/337 |

FOREIGN PATENTS

| 341,247 | 9/1921 | Germany | 126/337 |

*Primary Examiner*—Charles J. Myhre
*Attorney*—J. Calvin Brown

ABSTRACT: The device provides a tray movable forwardly and rearwardly relative to an oven grill positioned in an oven compartment for the purpose of supporting food being baked and to determine the degree of baking thereof.

PATENTED DEC 29 1970
3,550,580
Fig.1.
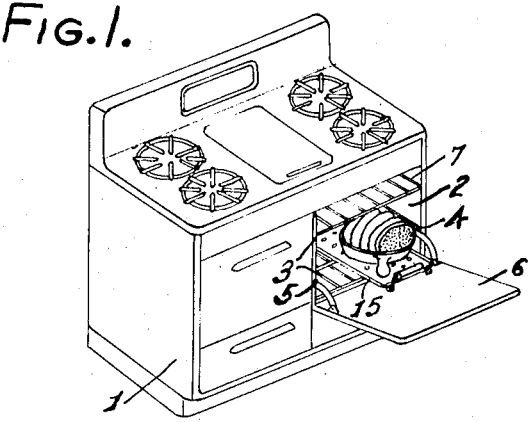
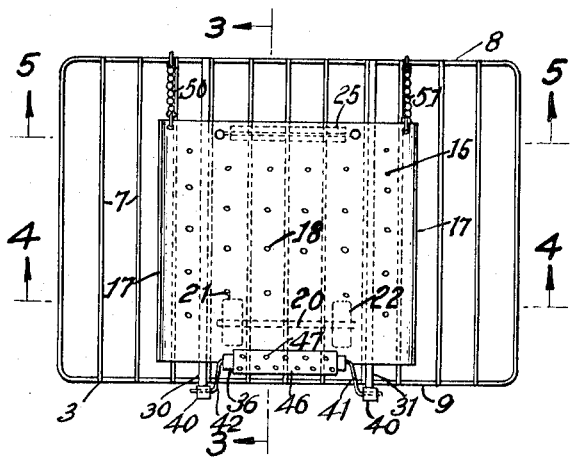
Fig.2.
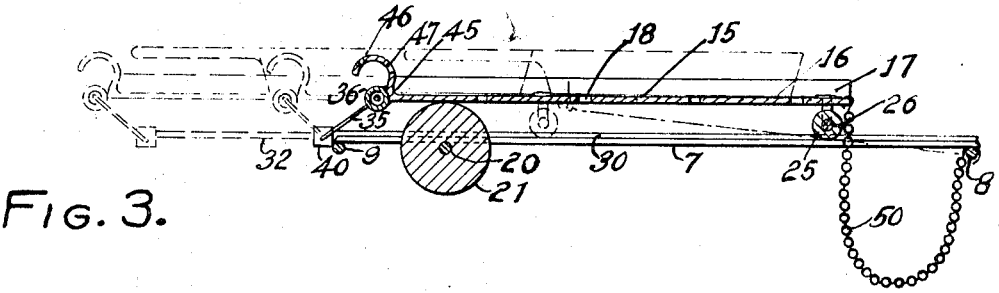
Fig.3.
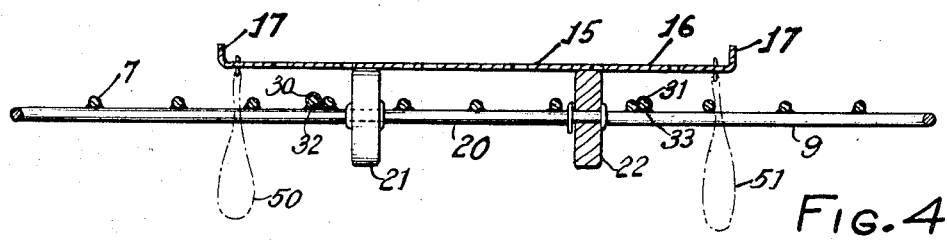
Fig.4.
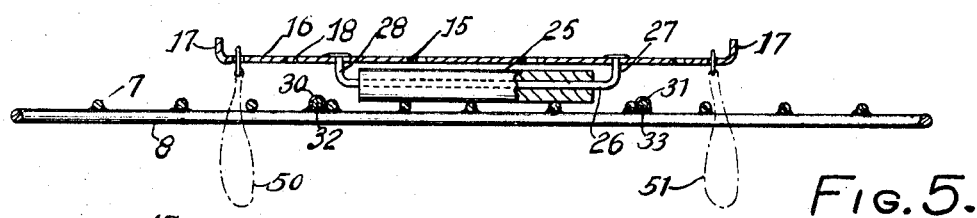
Fig.5.
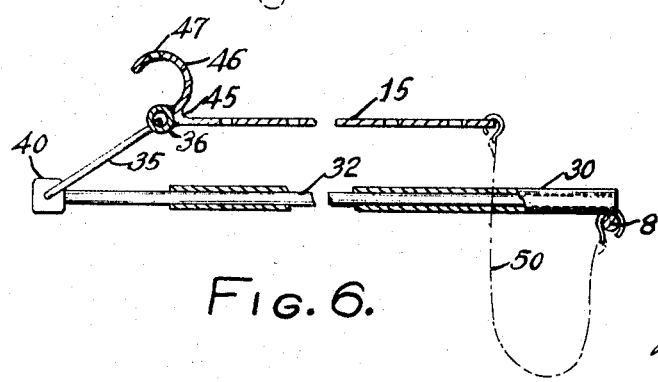
Fig.6.
INVENTOR.
JAMES LEE WONG,
BY
Calvin Brown,
ATTORNEY

MOVABLE TRAY FOR OVENS

BACKGROUND OF THE INVENTION AND SUMMARY

The invention contemplates a tray mounted for movement on oven grill forwardly or rearwardly thereof so that any article on the tray which is being cooked can be readily inspected and the degree of cooking ascertained.

It is sometimes difficult for the chef or cook to determine the extent of broiling, baking, or cooking of different foods such as pastries, biscuits, roasts or steaks and other meats in the oven of a stove and the present device has for an object the provision of means whereby foods in the oven may be easily brought into position for observation during a cooking operation.

A further object is the provision of means for an oven whereby different articles to be baked or cooked, usually upon the oven grill, may be readily inspected without any rear of being burned.

Devices which contemplate rollers attached to an oven grill require that the food being baked or cooked move on said rollers. Usually the food is placed within a pan but the pan must be brought forwardly and this entails a danger of being burned. The present device overcomes this difficulty in that the food is supported upon a tray, the tray being movable.

BRIEF DESCRIPTION OF THE DRAWING

FIG. 1 is a front perspective view of a stove having an oven incorporating the invention;

FIG. 2 is a plan view of an oven grill with a tray incorporating the invention secured to said grill the grill and the tray being on an enlarged scale from that shown in FIG. 1;

FIG. 3 is a cross-sectional view on an enlarged scale, taken on the line 3–3 of FIG. 2;

FIG. 4 is a sectional view, on an enlarged scale, taken on the line 4–4 of FIG. 2;

FIG. 5 is a sectional view on the line 5–5 of FIG. 2, and on an enlarged scale; and, FIG. 6 is a fragmentary, partly sectional view of certain operating features of the tray.

DESCRIPTION OF PREFERRED EMBODIMENT

Referring to the drawing, FIG. 1 shows a stove 1 having a broiler or oven compartment 2, said compartment having within the same one or more grills 3 which extend between side wall framing 4 and 5 for said compartment. In addition, the broiler or over compartment has the usual swing door 6 for closing the compartment. As is usual practice, the grills 3 are carried upon rails, not shown, within the broiler or oven compartment whereby the grills may be removed therefrom, as desired. These grills usually take the form shown in FIGS. 1 and 2 having spaced apart transverse rods 7 secured between lengthwise parallel rods 8 and 9. This construction forms a framing and allows the heat of the oven to pass between the rods of the grill. As previously stated, it is often difficult to inspect foods being cooked within the oven and upon the grill without sliding the food or the container therefor forwardly for inspection. As this operation imposes a hazard to the cook, a movable tray 15 is provided for movement on the lateral rods 7 of the grill. The tray preferably has a flat bottom 16 and shallow or low parallel rims 17 at sides of the tray although the rims may completely surround the tray if desired. The bottom of the tray is preferably perforated as shown at 18 so that the heat of the oven may pass therethrough without being shielded. The grill 3 has secured below certain of the lateral rods 7 an axle 20 carrying spaced apart wheels 21 and 22. The diameter of the wheels is such as to raise the tray slightly above the top surfaces of the rods 7, as shown, for instance, in FIG. 3. The rear of the tray is supported by a roller 25 which extends transversely beneath the tray for a portion of its width, the roller being mounted upon a rod or axle 26 having angular ends 27 and 28 which are secured to the tray, as shown in FIG. 5. The roller 25 rests upon the top of certain of the transverse rods 7 of the grill, thus one roller support is carried by the rear of the tray while the grill rods 7 by means of rollers support the front of the tray when the tray is in the position shown in FIG. 2. To control the tray in its movement both inwardly and outwardly of the oven compartment when positioned on the grill 3, guide means is provided. The guide means is best shown in FIG. 6 and includes a pair of spaced apart tubes 30 and 31 and rods 32 and 33 telescopically received within the tubes. The inner end of each tube 30 and 31 is secured by welding or by other means to grill member 8 at the inner ends thereof while the outer ends of the rods 32 and 33 are flexibly secured by wire 35, which wire extends through a tube 36 secured to the front edge of the tray. The construction includes a small block 40 for the outer end of each rod 32 and 33 and the flexible wire is bent at its ends as shown in FIG. 2 at 41 and 42 in crank arm form with ends of said wire extending transversely through openings in the blocks 40. The front edge of the tray at 45 is provided with an upwardly extended semicircular handle 46. This handle partly extends across the front edge of the tray and the handle is provided with perforations 47 to relieve heat therefrom. The flexible wire 35 permits the tray to move forwardly or rearwardly of the grill without lifting the tray upwardly as the tray moves from the full line position of FIG. 3 to the dotted line position thereof. Thus the tray remains substantially level during its movement. To limit tray movement outwardly, a pair of chains 50 and 51 are connected to the grill rod 8 at one end while the opposite end of each chain is secured to the rear of the tray, as shown in FIGS. 3 and 6, hooks being utilized for the chains, as shown.

The operation, uses and advantages of the invention are as follows.

The rear of the tray is supported by roller 25 for movement upon lateral rods 7 of the grill as shown in FIGS. 2, 3 and 5, while the front of the tray is supported by the wheels 21 and 22 secured to the grill as shown in FIGS. 3 and 4. Thus the tray normally is held level and substantially parallel to the top of the grill and elevated thereabove. By grasping the handle 46, the tray may be moved forwardly being guided in its movement by the means shown in FIG. 6 which means lies adjacent the side edges of the tray and specifically the flanges 17. The tray has limited outward movement governed by the length of the chains 50 and 51. Thus the tray may be moved from within the oven or broiler compartment a considerable distance over the open door 6 to permit inspection of the article being cooked which as shown in FIG. 1, is a roast, held in a suitable pan. The tray will not move appreciably out of a horizontal position or from a position which parallels a grill as tipping movement of the tray downwardly is prevented by the chains 50 and 51, and in the manner shown in FIG. 3. Thus when the tray moves to the forward broken line position in FIG. 3, the roller 25 will lie closely adjacent the wheels 21 and 22 and the chains 50 and 51 will be extended to full length and will prevent further outward movement of the tray. In the present instance the food in the pan is practically central of the tray, so no tipping movement of the tray will result. After inspection of the article being baked, the tray may be returned within the oven by pushing upon the handle 46. The tray, in addition to supporting various food items, may be used as a cooky sheet and for such other uses as may occur to the person utilizing the invention.

I claim:

1. A stove having an oven compartment with a grill within said compartment and supported transversely thereof, the improvement which consists in providing a tray, a roller support on the bottom of said tray for engagement with the grill and a wheel support carried by the grill for engagement with the bottom of the tray and whereby the tray may be moved inwardly or outwardly of the oven compartment on said grill.

2. The device as set forth in claim 1, and means between the tray and the grill for guiding movement of the tray inwardly and outwardly of the oven compartment.

3. The device as set forth in claim 2, and chains attached to the grill and said tray for limiting outward movement of the tray from the oven compartment.

4. The device as set forth in claim 1, said tray having a perforated flat bottom.

5. The device as set forth in claim 4, and the forward edge of said tray being provided with a perforated semicircular handle.

6. The device as set forth in claim 2, said guide means comprising telescopic tube and rod members, the rod members being connected by means to the tray and the tube members connected to the grill.